United States Patent
Riblet

(10) Patent No.: US 7,780,130 B2
(45) Date of Patent: *Aug. 24, 2010

(54) SHACKLE FOR LOAD SUPPORTING BRACKET ASSEMBLY

(76) Inventor: Henry J. Riblet, Bob 232, Melvin Village, NH (US) 03650

( * ) Notice: Subject to any disclaimer, the term of this patent is extended or adjusted under 35 U.S.C. 154(b) by 0 days.

This patent is subject to a terminal disclaimer.

(21) Appl. No.: 12/313,707

(22) Filed: Nov. 24, 2008

(65) Prior Publication Data

US 2009/0090582 A1 Apr. 9, 2009

Related U.S. Application Data

(63) Continuation of application No. 11/398,426, filed on Apr. 5, 2006, now Pat. No. 7,475,856.

(51) Int. Cl.
*E04G 3/20* (2006.01)
(52) U.S. Cl. .................. 248/248; 248/246; 182/136
(58) Field of Classification Search .................. 248/248, 248/246, 235, 243; 182/136, 146
See application file for complete search history.

(56) References Cited

U.S. PATENT DOCUMENTS

| 2,216,912 | A | * | 10/1940 | Hoitsma | 182/136 |
| 2,342,427 | A | * | 2/1944 | Riblet | 248/246 |
| 4,103,856 | A | * | 8/1978 | Riblet | 248/246 |
| 4,597,471 | A | * | 7/1986 | Anderson | 182/136 |
| 5,259,478 | A | * | 11/1993 | Berish et al. | 182/136 |
| 6,126,127 | A | * | 10/2000 | Riblet | 248/219.4 |
| 6,273,381 | B1 | * | 8/2001 | Riblet | 248/248 |
| 7,475,856 | B2 | * | 1/2009 | Riblet | 248/248 |

* cited by examiner

*Primary Examiner*—Anita M King
(74) *Attorney, Agent, or Firm*—Jacobson and Johnson; Thomas N. Phung

(57) ABSTRACT

A shackle for supporting a platform support on an upright comprising a first side member and a second side member, an inner load bearing jaw and an outer load bearing jaw mounted on the first and second side members with the inner load bearing jaw for engaging a first surface of the upright and the outer load bearing jaw for engaging a second surface of the upright, and a locking jaw mounted on the side members and movable between an upright engaging condition to prevent the lowering of the shackle on the upright and an upright non-engaging condition to allow for the lowering of the shackle on the upright.

4 Claims, 5 Drawing Sheets

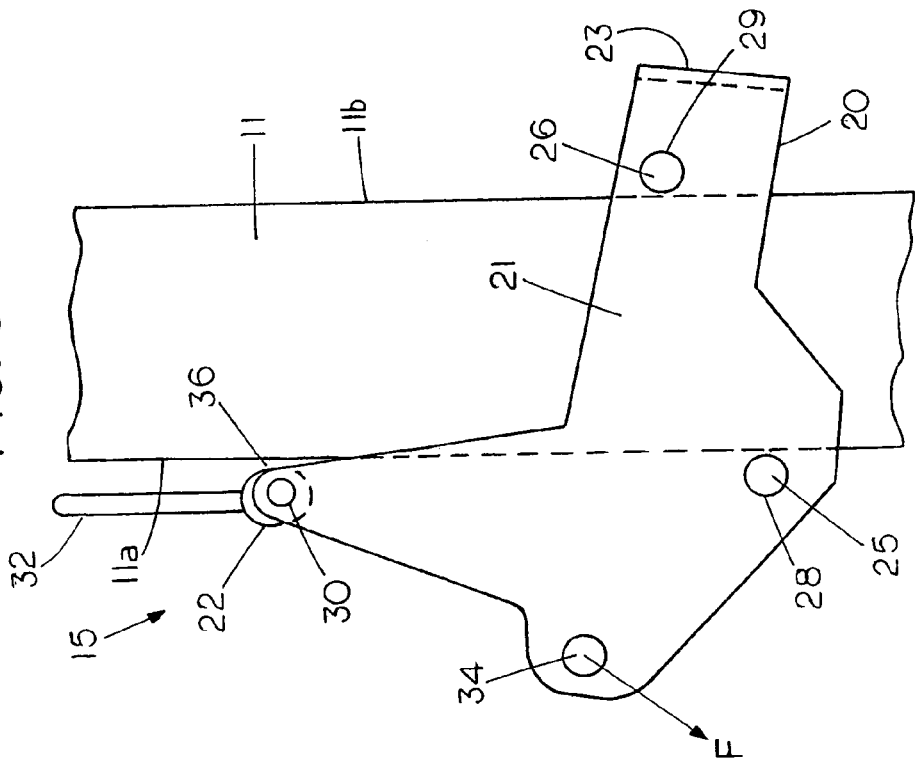
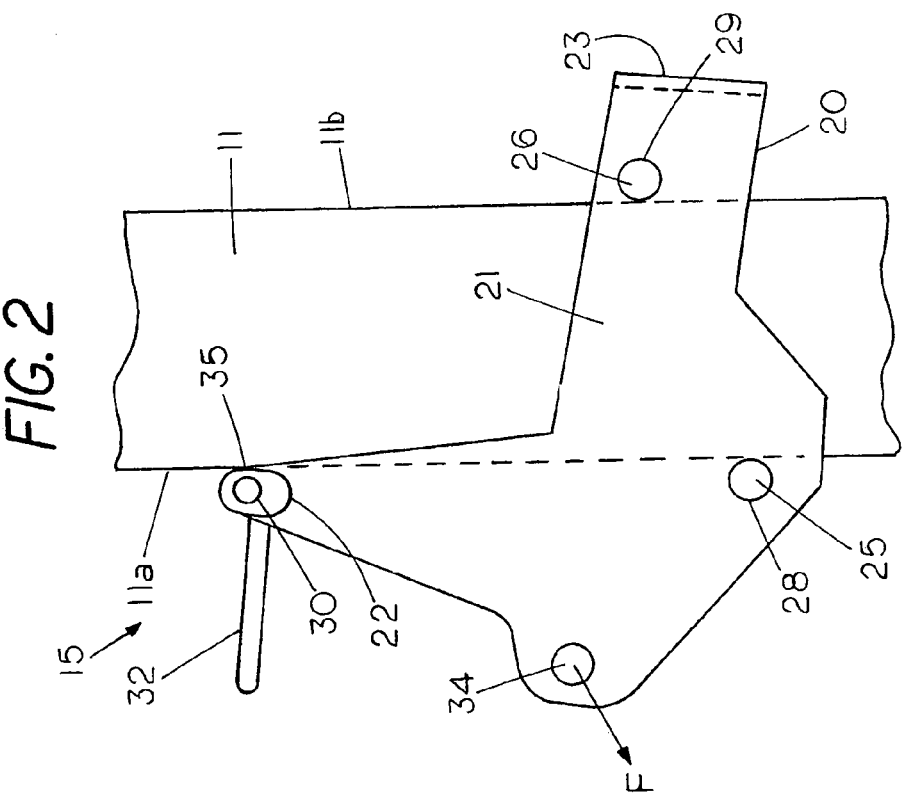

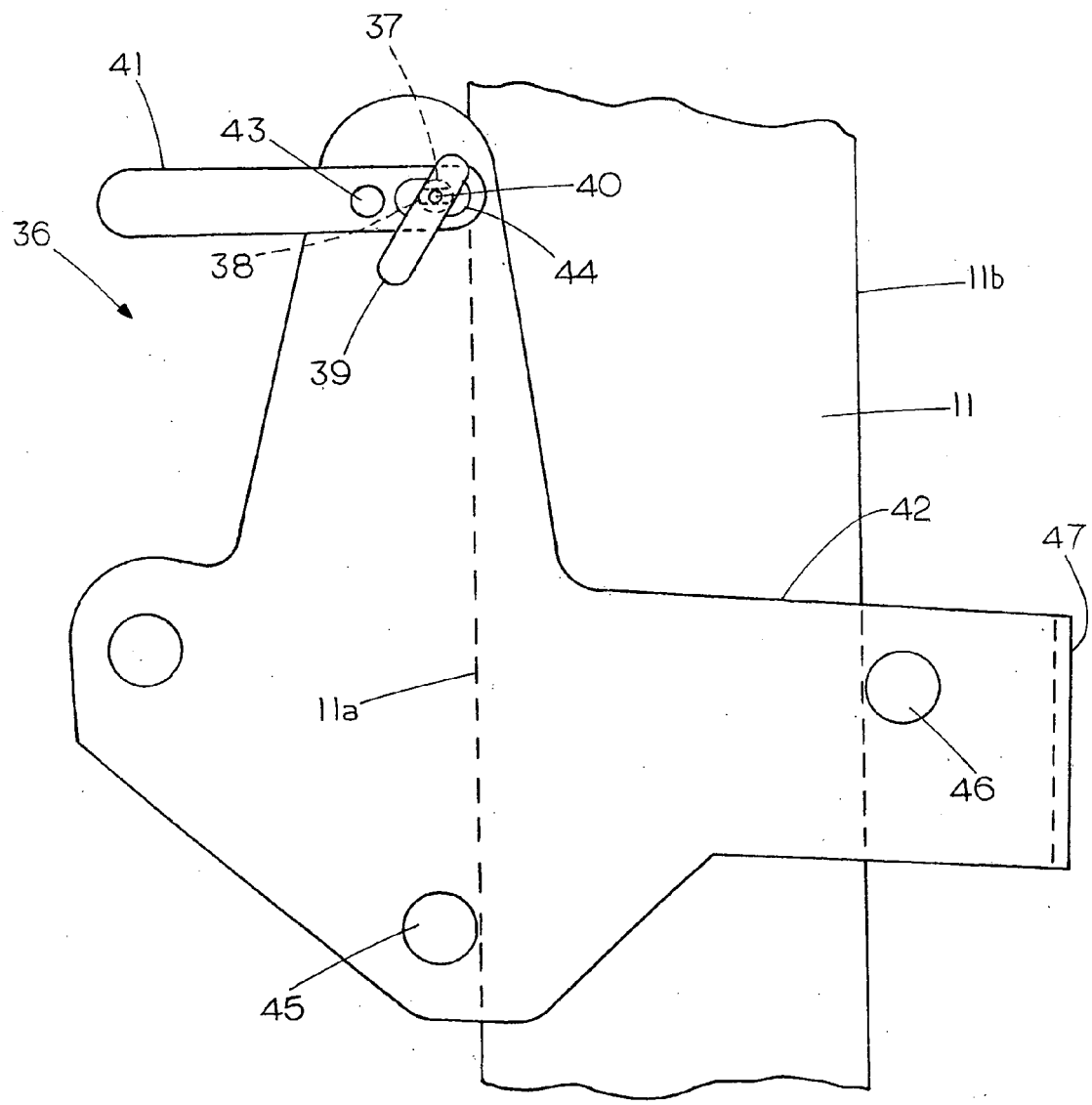

US 7,780,130 B2

SHACKLE FOR LOAD SUPPORTING BRACKET ASSEMBLY

CROSS REFERENCE TO RELATED APPLICATIONS

This application is continuation of U.S. patent application Ser. No. 11/398,426; filed on Apr. 5, 2006, now U.S. Pat. No. 7,475,856; titled SHACKLE FOR LOAD SUPPORTING BRACKET ASSEMBLY.

STATEMENT REGARDING FEDERALLY SPONSORED RESEARCH OR DEVELOPMENT

None

REFERENCE TO A MICROFICHE APPENDIX

None

FIELD OF THE INVENTION

This invention relates generally to adjustable height platform supports and more specifically, to an improved shackle for a load supporting bracket assembly.

BACKGROUND OF THE INVENTION

Adjustable height platform supports are well known in the art and typically comprise four main elements, namely an upright, a bracket assembly for supporting a platform, a jack or block and tackle for raising and lowering the bracket assembly on the upright, and a means for holding the upper end of the upright in place.

Two types of adjustable height platform supports with uprights constructed of wood or rubber-backed aluminum are well known and widely used.

An example of an adjustable height platform support with the upright constructed of wood is shown in Hoitsma U.S. Pat. No. 2,216,912. The Hoitsma patent discloses a bracket assembly in which a jack is used to raise and lower the bracket assembly. This type of bracket assembly is referred to as a "Pump Jack". Another example of an adjustable height platform support with a wooden upright is shown in U.S. Pat. No. 2,342,427 to Henry J. Riblet (herein after "Riblet'427 patent"). The Riblet '427 patent discloses a bracket assembly, which is raised and lowered by block and tackle. This type of bracket assembly mounted on an upright has been commonly referred to as the "Painter's Pole".

Examples of adjustable height platform supports, which use an aluminum upright, to which a rubber strip has been riveted, include U.S. Pat. No. 4,597,471 to Anderson and U.S. Pat. No. 5,259,478 to Berish et al. It should be noted that the Anderson patent and the Berish patent both adapt aspects of the Hoitsma pump jack mechanism.

In the Painter's Pole bracket assembly, an inner jaw of a shackle of the Painter's Pole bracket assembly is located below a plane containing both the fulcrum axis and an outer jaw of the shackle. A load on the angle bracket of the Painter's Pole bracket assembly provides a turning movement on the shackle, which activates the shackle by bringing both jaws, namely the outer jaw and an inner jaw of the shackle into contact with the upright when the width of the upright exceeds a "design width". Accordingly, a shackle in which the inner jaw lies below the plane through the fulcrum axis and outer jaw will be referred to as a 'load activated shackle'.

It is noted that the shackle of the pump jack bracket assembly and shackle of the painter's pole bracket assembly are similar in that they have two parallel side members, which support the two jaws. The two jaws function to directly contact the upright and transfer forces acting on the angle bracket to the upright.

The two parallel side members are indirectly pivotally coupled to the load supporting angle bracket for the pump jack and directly pivotally coupled to the load supporting angle bracket of the painter's pole by means of the fulcrum bar. In both cases, the angle bracket may be lowered by rotating the shackle about the fulcrum bar in a downward direction. In practice, the aforementioned is advantageous in that an operator may lower the angle bracket if the operator depresses the shackle, directly or indirectly, with his foot. Of course, a heavy object falling on the shackle can cause an accident.

Although pump jacks and painter's poles are usually used to support a scaffold extending between a pair of adjustable height platform supports so that a workman can move back and forth between the uprights, there are a number of other applications for these adjustable height platform supports.

BRIEF SUMMARY OF THE INVENTION

The present invention comprises an improved shackle for fastening a bracket assembly of an adjustable height platform support to an upright so that the bracket assembly cannot be released inadvertently.

In one embodiment of the present invention, the shackle comprises a pair of side members having an inner load bearing jaw and an outer load bearing jaw mounted thereon with the inner load bearing jaw for engaging a first surface of the upright and the outer load bearing jaw for engaging a second surface of the upright.

The shackle also includes a locking jaw eccentrically mounted on the side members, the locking jaw movable between an upright engaging condition to prevent the lowering of the shackle on the upright and an upright non-engaging condition to allow for the lowering of the shackle on the upright. The shackle further includes a device such as a fulcrum bar or the like for pivotally mounting it to an angle bracket.

DESCRIPTION OF THE PRIOR ART

U.S. Pat. No. 2,216,912 teaches a bracket assembly in which a jack is used to raise and lower the bracket assembly.

U.S. Pat. No. 2,342,427 teaches a bracket assembly, which is raised and lowered by block and tackle.

U.S. Pat. No. 4,597,471 teaches a pump jack release mechanism actuated without the operator having to extend the operator's foot over an edge of the platform.

U.S. Pat. No. 5,259,478 teaches a pump jack having a protective cover for a crank down portion of the pump jack to avoid hazards upon wear of the roller.

BRIEF DESCRIPTION OF THE DRAWINGS

FIG. 2 shows a close-up side view of the shackle of FIG. 1 in a lock condition preventing the lowering of the shackle on the upright;

FIG. 3 shows a close-up side view of the shackle of FIG. 1 in an unlock condition allowing the lowering of the shackle on the upright;

FIG. 4 shows an alternative embodiment of a shackle of the present invention;

DESCRIPTION OF THE PREFERRED EMBODIMENT

The present invention generally comprises an improved shackle for a load supporting bracket assembly. The shackle includes a locking jaw, which in one setting prevents the shackle and hence the bracket assembly from being lowered on an upright and in another setting permits the shackle and hence the bracket assembly to be lowered on the upright.

Figure 1:
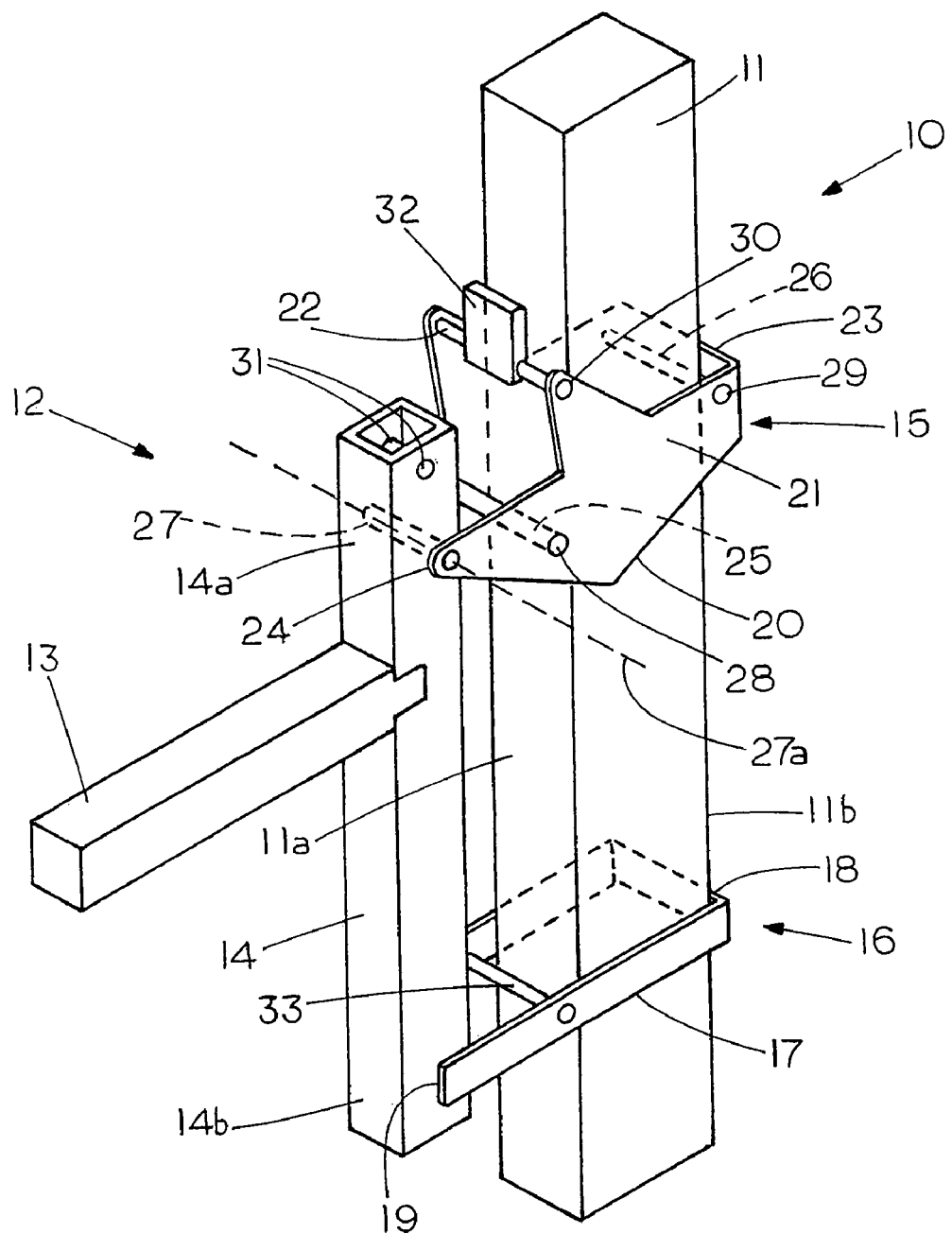
FIG. 1 shows a perspective view of a bracket assembly of the present invention mounted on an upright.

FIG. 1 shows a perspective view of a bracket assembly 10 of the present invention mounted on an upright 11. Bracket assembly 10 includes an angle bracket 12 having a horizontal leg 13, a vertical leg 14, a load-activated shackle 15, and a lower bracket cage 16. It is noted that bracket assembly 10, as shown in FIG. 1, can be used to form an adjustable height scaffold in several ways. For example the bracket assembly 10 can be used in sets of four to support a platform of extended area. A short platform mounted on a single bracket assembly 10 supported on upright 11 could also replace a single ladder in some applications.

The lower bracket cage 16, as shown in the embodiment of FIG. 1, comprises a U-shaped band 17 having a closed end 18 and an open end 19. Lower bracket cage 16 is shown coupled to angle bracket 12 by the securement, such as by welding, of the open end 19 of band 17 onto a lower end 14b of vertical leg 14 so that the presence of a vertical load on horizontal leg 13 of angle bracket 12 will force a bar 33 against inner surface 11a of upright 11.

The load-activated shackle 15 as shown in the embodiment of FIG. 1 comprises a generally U-shaped band 20 having spaced apart, parallel side members 21, a locking jaw 22, a closed end 23, an open end 24, an inner jaw 25 located proximal open end 24, an outer jaw 26 located proximal closed end 23, and a fulcrum bar 27 for pivotally attaching the shackle 15 to angle bracket 12. Load-activated shackle 15 is dimensioned such that a downward motion of the bracket assembly 10 on upright 11 is prevented unless load-activated shackle 15 is rotated in a clockwise direction and locking jaw 22, which prevents the clockwise rotation of the shackle 15, is rotated sufficiently in the clockwise direction.

Side members 21 of U-shaped band 20 include a first pair of apertures 28, a second pair of apertures 29 and a third pair of apertures 30. The first pair of apertures 28 is shown in the embodiment of FIG. 1 as disposed beneath a horizontal plane defined by a fulcrum pivot axis 27a. The third pair of apertures 30 is shown as disposed above the horizontal plane defined by fulcrum pivot axis 27a while the second pair of apertures 29 is shown as disposed below the horizontal plane defined by fulcrum pivot axis 27a.

First and second pairs of apertures 28 and 29 are shaped to receive inner jaw 25 and outer jaw 26 therein. Inner jaw 25 and outer jaw 26 are secured in their respective apertures 28 and 29 in the side members 21 of the shackle 15, and function to engage respectively inner surface 11a and outer surface 11b of upright 11 to effectively transfer a force placed on shackle 15 by a vertical load on horizontal member 13 to vertical upright 11. Although inner jaw 25 and outer jaw 26 are shown in the embodiment of FIG. 1 as comprising a bars or rod-shaped members the structure of the jaws can comprise alternative shapes as long as the aforementioned shapes can effectively transfer forces acting on bracket assembly 10 to upright 11.

In the embodiment of FIG. 1, the side members 21 of U-shaped band 20 are shown coupled to angle bracket 12 at an upper end 14a of vertical leg 14 by a fulcrum bar 27, which is shown as comprising a generally cylindrical shape. Specifically, fulcrum bar 27 extends through side members 21 and vertical leg 14 and provides a fixed pivoting axis 27a about which load activated shackle 15 is free to pivot relative to angle bracket 12. It is noted that fulcrum bar 27 can comprise any conventional device for pivotally mounting load activated shackle 15 onto angle bracket 12. Although the fulcrum bar 27 is shown in the form of a rod held in place by a pair of nuts (not shown), the fulcrum bar 27 can be replaced with any device, which attaches shackle 15 directly to angle bracket 12 and still permits shackle 15 to pivot with respect to angle bracket 12 about fulcrum pivot axis 27a.

Although angle bracket 12 is shown in the embodiment of bracket assembly 10 of FIG. 1, it is to be understood that angle bracket 12 can be replaced with alternative types of angle brackets without departing from the spirit of the present invention. For example angle bracket 12 could be modified so that the outer end of horizontal leg 13 and the lower end of vertical leg 14 are reinforced by a diagonal leg (not shown). In an alternative embodiment, angle bracket 12 could be replaced with the substantially triangular bracket shown in U.S. Pat. No. 6,126,127.

It is noted that although load activated shackle 15 of the present invention is shown in the embodiment of FIG. 1 as comprising a generally U-shaped band 20 having pair of side members 21 and a closed end 23, the load activated shackle 15 of the present invention is not limited to U-shaped band 20. For example, alternative embodiments of the present invention can include the use of alternative devices in place of U-shaped band 20 such as simply a pair of spaced apart side members without departing from the spirit of the present invention.

In regards to locking jaw 22, locking jaw 22 is referred to as a 'locking jaw' because locking jaw 22 is positioned above the horizontal plane defined by fulcrum axis 27a and outer jaw 26 and is properly dimensioned so that its angular position in apertures 30 determines whether or not the shackle 15 can be rotated in a positive direction, i.e. a clockwise direction, to permit the lowering of bracket assembly 10 on upright 11. More specifically, locking jaw 22 is pivotally mounted in the apertures 30 of side members 21 in a condition in which when said locking jaw is rotated in a clockwise direction to a first position, there exists sufficient clearance between locking jaw 22 and upright 11 to permit the lowering of bracket assembly 10. Conversely, when locking jaw 22 is rotated sufficiently in a negative or counter clockwise direction to a second position, no such clearance exist, which results in locking jaw 22 preventing an inadvertent, downward blow on the closed end 23 of shackle 15 from opening the shackle 15 thereby preventing the lowering of bracket assembly 10 on upright 11.

It is noted that vertical leg 14 includes a pair of apertures 31 for the attachment of a conventional block and tackle device (not shown) or a conventional jacking device (not shown) therethrough to enable bracket assembly 10 to be raised and lowered.

In the embodiment of FIG. 1, locking jaw 22 is shown including a handle 32 attached thereto to facilitate the rotation of the locking jaw 22 between a first position that prevents lowering of bracket assembly 10 on upright 11, to a second position that permits lowering of bracket assembly 10 on the upright 11. Handle 32 also functions to provide a visual indication of the positioning of locking jaw 22 between the first and second position.

In regards to upright 11, it is understood that upright 11 need not have the rectangular cross section shown in FIG. 1. In addition, upright 11 is also not limited to the engagement of inner jaw 25 and outer jaw 26 and locking jaw 22 with the upright 11 as shown in FIG. 1. It is also understood that the lower bracket cage 16 is not limited to the particular construction shown in FIG. 1 and can comprise of alternative types of bracket cages without departing from the spirit of the present invention.

Referring to FIGS. 2 and 3, FIGS. 2 and 3 are close-up side views illustrating the operation of locking jaw 22 in controlling the displacement and more specifically, the downward displacement of shackle 15 with respect to upright 11. It is noted that in FIGS. 2 and 3 angle bracket 12 and lower bracket cage 16 of FIG. 1 have been replaced by a force F to emphasize the fact that the angle bracket 12 and lower bracket cage 16 can be replaced by any structure or combination of structures that exert a downward force on the fulcrum rod 27 with a component directed away from the upright 11.

Note in FIGS. 2 and 3 that the side members 21 of U-shaped band 20 are provided with a pair of apertures 34 through which force F is transmitted to shackle 15. Side members 21 of the shackle 15 include two pairs of apertures 28 and 29, which transmit force F to jaws 25 and 26 and thence to the upright 11.

In regards to the location of apertures 28, note that although apertures 28 are shown in FIGS. 2 and 3 as located below the plane defined by fulcrum axis 27a and apertures 29 (shown in FIG. 1) so that the shackle 15 is "load activated," apertures 28 can also be located anywhere on side members 21 so long as force F maintains inner and outer jaws 25 and 26 in apertures 28 and 29 in gripping engagement with upright 11.

Referring to FIG. 2, note that locking jaw 22 is mounted eccentrically in apertures 30 of side members 21 in a condition in which locking jaw 22 engages with inner surface 11a at a contact point 35 when handle 32 projects in a generally horizontal direction. The aforementioned engagement between the locking jaw 22 and upright 11 prevents the rotation of shackle 15 in a clockwise direction, which locks the shackle 15 in position so that bracket assembly 10 cannot be lowered by depressing closed end 23 of the shackle 15. Moreover, the horizontal force on locking jaw 22 at contact point 35 increases the counter clockwise torque on the shackle 15 and so increases the horizontal forces on inner and outer jaws 25 and 26, which support the bracket assembly 10.

It should also be noted that while locking jaw 22 contacts inner surface 11a any downward motion of the shackle 15 will rotate locking jaw 22 in a counter clockwise direction to further increase the horizontal forces, which ultimately support the load. On the other hand, an upward motion of shackle 15, when locking jaw 22 is in contact with the inner surface of upright 11, will rotate locking jaw 22 in a clockwise direction and free inner jaw 25 and outer jaw 26 from inner surface 11a and outer surface 11b of upright and permit shackle 15 and the attached angle bracket 12 to be raised by block and tackle or pump jack.

FIG. 3 is identical to FIG. 2 except that locking jaw 22 and handle 32 have been rotated ninety degrees in a clockwise direction. In the aforementioned position handle 32 is located in a vertical position and parallels upright 11. Because locking jaw 22 pivots eccentrically in apertures 30 of the side members 21 of shackle 15 and because the location of the apertures 30 depends on their dimensional relationship with inner and outer jaws 25 and 26, the contact point 35 which occurred in FIG. 2 is replaced by the clearance gap 36 in FIG. 3. When handle 32 is raise to a vertical position, shackle 15 and the angle bracket (not shown), which it supports can now be lowered by rotating the shackle in a clockwise direction.

When handle 32 is rotated to a lower position, in either direction, gap 36 is reduced in size and, if the dimensions determining the relative location of load bearing jaws 25, 26 and locking jaw 22 and upright 11 are properly chosen, the gap will vanish, so that locking jaw 22 contacts inner surface 11a of the upright 11. In the aforementioned condition a heavy object falling on the handle will tighten the grip, which inner and outer jaws 25 and 26 have on the upright 11. In order for the shackle 15 to experience an inadvertent fall, the closed end 23 of the shackle 15 would have to be lowered while handle 32 of locking jaw 22 is raised, which is a remote possibility.

In further regards to locking jaw 22, it should be noted that although FIGS. 2 and 3 each show locking jaw 22 having a cylindrical cross section mounted eccentrically in apertures 30 of the side members 21 of shackle 15, the particular structure of locking jaw 22 is not essential to the present invention. For example, the cross section of the jaw could have many shapes and the jaw could be slidably or pivotally mounted on the side members in various ways.

Figure 5:
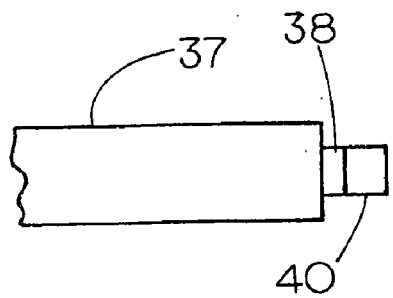
FIG. 5 shows a partial side view of the locking jaw of the shackle of FIG. 4.
Figure 5A:
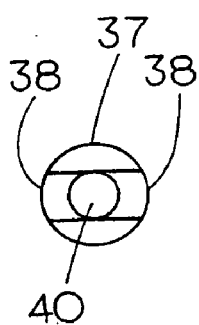
FIG. 5A shows an end view of the locking jaw of FIG. 5.
Figure 5B:
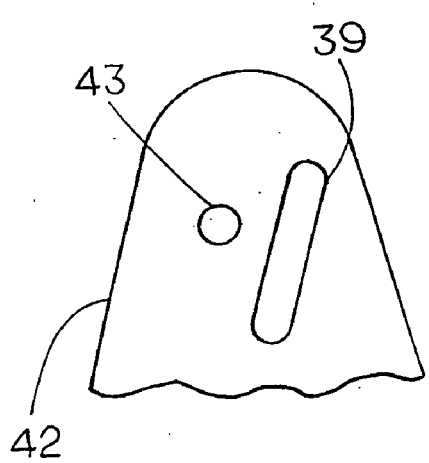
FIG. 5B shows a partial side view of a side member of the shackle of FIG. 4.
Figure 5C:
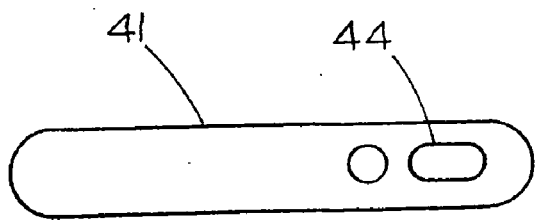
FIG. 5C shows a side view of a handle of the shackle of FIG. 4.

Referring to FIGS. 4, 5, 5A, 5B, and 5C, FIG. 4 shows an alternative embodiment of a shackle 36 having a locking jaw 37 with shackle 36 comprising similar parts to the shackle 15 of FIGS. 2 and 3. FIGS. 5, 5A, 5B, and 5C illustrate the individual components of the locking jaw 37 of FIG. 4. Referring to FIGS. 5, 5A, and 5B, locking jaw 37 includes flanges 38 located at the ends of locking jaw 37, which function to engage slots 39 in side members 42. Slots 39 permit locking jaw 37 to move up and down without permitting locking jaw 37 to rotate. Extending from the flanges 38 is an outer cylindrical boss 40. The position of the flanges 38 in slots 39 is determined by the orientation of handle 41, which is pivotally attached to side members 42 through pins 43 and by the engagement of the outer cylindrical bosses 40 of locking jaw 37 in slots 44 located on handle 41.

As shown in FIG. 4, outer cylindrical bosses 40 have been raised in slots 39 of side members 42 until locking jaw 37 contacts inner surface 11a of upright 11. If slots 39 are positioned sufficiently parallel to inner surface 11a of upright 11, the friction between flanges 38 and slots 39 prevents clockwise torque on side members 42 from moving the flanges downward in the slots. With handle 41 in the lock position, which places locking jaw 37 in contact with inner surface 11a, any further downward motion of the handle 41 increases the force, which the locking jaw 37 exerts on the inner surface 11a. On the other hand, raising the handle 41 removes the locking jaw 37 from contact with the inner surface 11a of upright 11 and permits shackle 36 to be rotated in clockwise direction so that the shackle 37 does not grip the upright 11. As with the eccentrically mounted locking jaw 30 of FIGS. 2 and 3, a heavy object falling on the handle 41 will tighten the grip which an inner jaw 45 and an outer jaw 46 has on the upright 11. In order for the shackle 36 to experience an inadvertent fall, a closed end 47 of the shackle 36 would have to be lowered while handle 41 of locking jaw 37 is raised.

Figure 7:
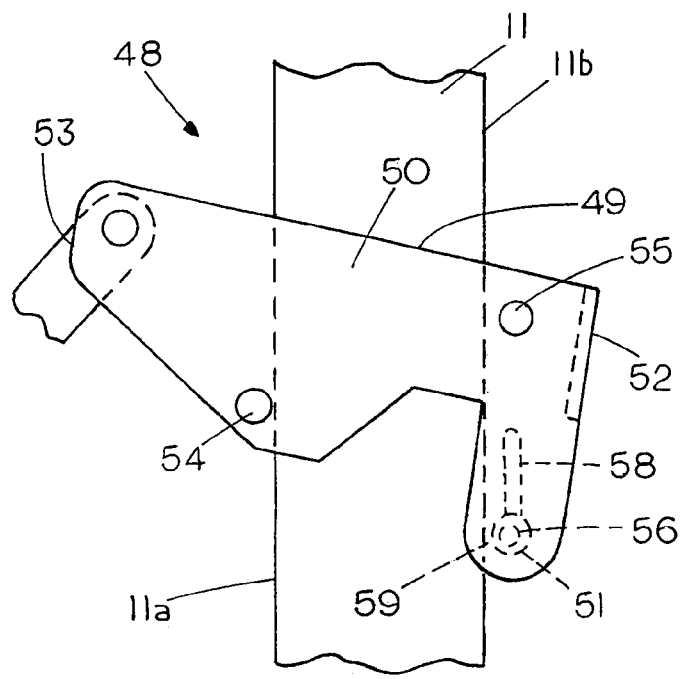
FIG. 7 show a close-up side view of the shackle of FIG. 6 in an unlock condition allowing for the lowering of the shackle on the upright.
Figure 6:
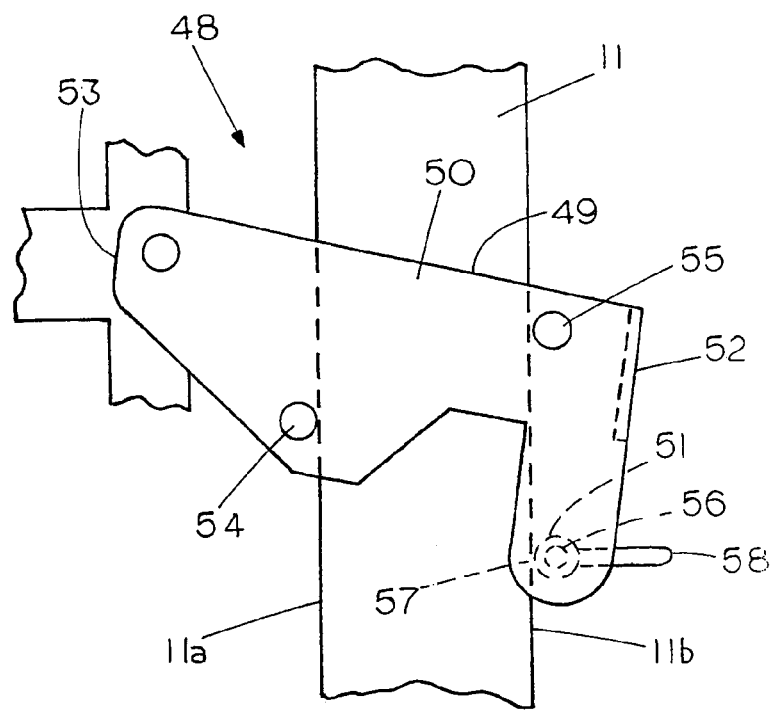
FIG. 6 shows a close-up side view of an alternative embodiment of a shackle in a lock condition preventing the lowering of the shackle on the upright.

Referring to FIGS. 6 and 7, FIGS. 6 and 7 show an alternative embodiment of a load-activated shackle 48 of the present invention similar to the load-activated shackle 15 of FIGS. 1, 2, 3, 4, and 5 in that the load-activated shackle 48 comprises a generally U-shaped band 49 having spaced apart, parallel side members 50, a locking jaw 51, a closed end 52 and an open end 53, an inner jaw 54 located proximal open end 53, an outer jaw 55 located proximal closed end 52.

Note however that unlike load-activated shackle 15 of FIGS. 1, 2, 3, 4, and 5, the locking jaw 51 of load-activated shackle 48 is located proximal the closed end 52 of U-shaped band 49 and is mounted eccentrically in apertures 56 of side members 50 in a condition in which locking jaw 51 engages with outer surface 11b of upright 11 at a contact point 57 when handle 58 projects in a generally horizontal direction. The aforementioned engagement between the locking jaw 51 and upright 11 also prevents the rotation of shackle 48 in a clockwise direction, which locks the shackle 48 in position so that a bracket assembly cannot be lowered by depressing closed end 52 of the shackle 48. In addition, the horizontal force on locking jaw 51 at contact point 57 increases the counter clockwise torque on the shackle 48 and so increases the horizontal forces on inner and outer jaws 54 and 55, which support the bracket assembly.

While locking jaw 51 contacts outer surface 11b, any downward motion of the shackle 48 will rotate the locking jaw 51 in a clockwise direction to further increase the horizontal forces, which ultimately support the load. An upward motion of shackle 48, when the locking jaw 51 is in contact with the outer surface 11b of upright 11 will rotate the locking jaw 51 in a clockwise direction and free inner jaw 54 and outer jaw 55 from inner surface 11a and outer surface 11b of upright 11 thereby permitting shackle 48 and an angle bracket attached thereto to be raised by block and tackle or pump jack.

FIG. 7 is identical to FIG. 6 except that locking jaw 51 and handle 58 have been rotated ninety degrees in a counter clockwise direction. In the aforementioned position handle 58 is located in a vertical condition and parallels upright 11. Because locking jaw 51 pivots eccentrically in apertures 56 of the side members 50 of shackle 48 and because the location of the apertures 56 depends on their dimensional relationship with inner and outer jaws 54 and 55, the contact 57 which occurred in FIG. 6 is replaced by a clearance gap 59 in FIG. 7. In the aforementioned position shackle 48 and the angle bracket, which it supports, can be lowered by the rotation of shackle 48 in a clockwise direction.

When handle 58 is rotated sufficiently to a lower position, in either direction, gap 59 is reduced in size and, if the dimensions determining the relative location of load bearing jaws 54, 55 and locking jaw 51 and upright 11 are properly chosen, the gap will vanish, so that locking jaw 51 contacts outer surface 11b of the upright 11. Similar to the embodiment of FIGS, 1, 2, 3, 4, and 5, in order for the shackle 48 to experience an inadvertent fall, the open end 53 of the shackle would have to be lowered while handle 32 of locking jaw 51 is raised, which is a remote possibility.

I claim:

1. A shackle for supporting a platform support on an upright comprising:
    a first side member and a second side member;
    an inner load bearing jaw and an outer load bearing jaw mounted on and connecting the first and second side members, the inner load bearing jaw engaging a first upright surface and the outer load bearing jaw engaging a second upright surface; and
    a locking jaw eccentrically mounted on the side members, said locking jaw moveable to directly engage a surface of said upright to prevent the lowering of the shackle and moveable to a spaced condition from said surface of said upright to permit the lowering of the shackle.

2. The shackle of claim 1 wherein the locking jaw includes a handle facilitating the movement of the locking jaw between the upright engaging condition and the upright non-engaging condition while providing a visual indicator of the position of the locking jaw, said handle generally located in a horizontal position when the locking jaw is at the upright engaging condition.

3. A shackle for supporting a platform support on an upright comprising:
    a first side member and a second side member;
    an inner load bearing jaw and an outer load bearing jaw mounted on the first and second side members, the inner load bearing jaw contacting a second upright surface; and
    a locking jaw mounted on the side members, said locking jaw moveable to directly engage a surface of said upright to prevent the lowering of the shackle and moveable to a spaced condition from said surface of said upright to permit the lowering of the shackle.

4. A shackle for supporting a platform support on an upright comprising:
    a side member;
    an inner load bearing jaw and an outer load bearing jaw mounted on said side member, the inner load bearing jaw contacting a first upright surface and the outer load bearing jaw contacting a second upright surface; and
    a locking jaw mounted on said side member, said locking jaw moveable to directly engage a surface of said upright to prevent the lowering of the shackle and moveable to a spaced condition from said surface of said upright to permit the lowering of the shackle.

* * * * *